July 9, 1957 W. E. HILLE 2,798,760
EXPANSIBLE CAMPING TRAILER
Filed March 15, 1954 2 Sheets-Sheet 1
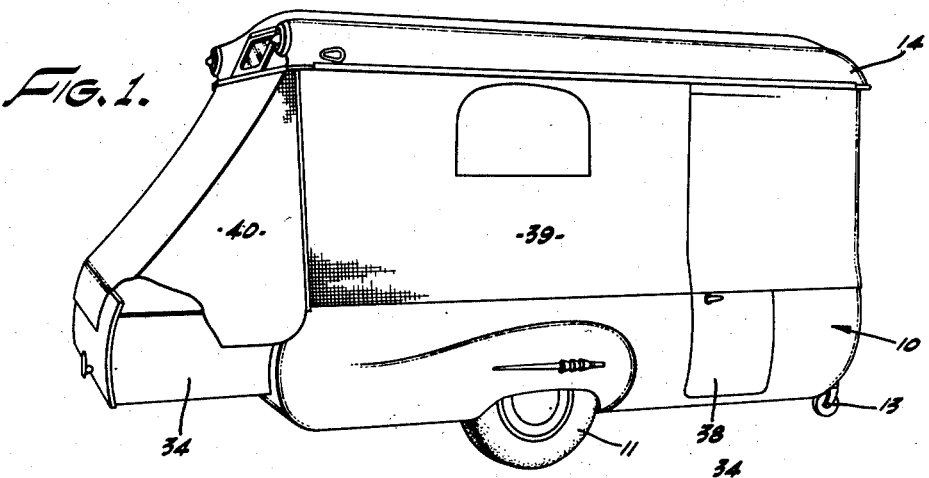
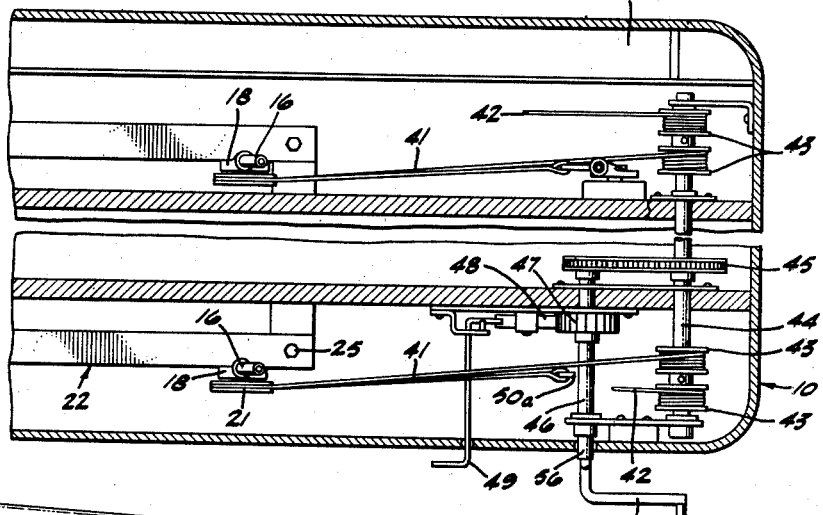
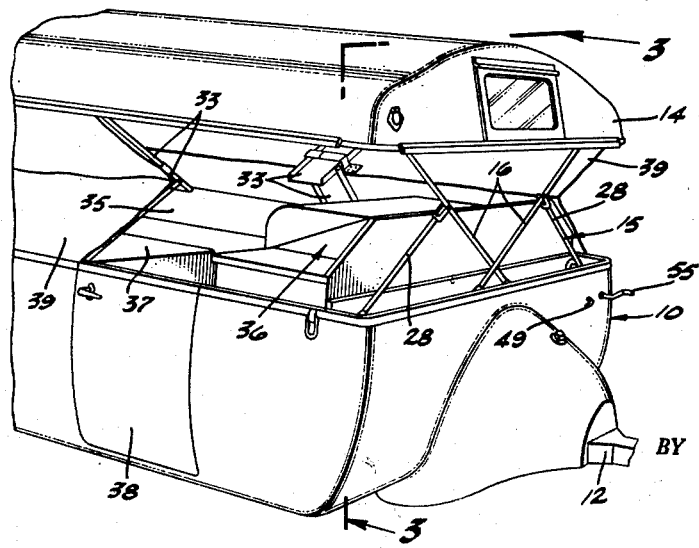
WALTER E. HILLE
INVENTOR.
BY Lyon & Lyon
ATTORNEYS

WALTER E. HILLE
INVENTOR.

BY Lyon & Lyon
ATTORNEYS

United States Patent Office 2,798,760
Patented July 9, 1957

2,798,760

EXPANSIBLE CAMPING TRAILER

Walter E. Hille, Puente, Calif., assignor, by mesne assignments, to Forrest M. Holmes, Minneapolis, Minn.

Application March 15, 1954, Serial No. 416,137

4 Claims. (Cl. 296—23)

This invention relates to expansible camping trailers of the general type which are collapsed while being transported over the road and which are expanded when a camp site is reached.

This invention is particularly directed to improvements in lifting mechanisms for raising the trailer roof from transport position where it acts as a closure for the trailer body to elevated position wherein head room is provided for persons standing within the trailer. Accordingly it is the principal object of this invention to provide improved lifting mechanism for raising and lowering the roof of a collapsible tariler.

Another object is to provide mechanism of this type which has a relatively long stroke and yet is light in weight and reliable in operation.

Another object is to provide a device of this type which serves to brace the roof against sidewise movement when lifted.

Another object is to provide lift mechanism of this type which may be applied to opposite sides of the trailer body or to opposite ends thereof, as desired, which may readily be coordinated so that both lift mechanisms operate conjointly from a single actuator which is readily accessible.

A more particular object is to provide a lift mechanism employing a pair of lifting legs which are pivoted to the roof at their upper ends and which have lower ends sliding in a horizontal trackway together with pivoted braces which serve to produce straight line vertical movement of the upper ends of the lifting legs.

A more detailed object is to provide a device of this type in which auxiliary means are provided for applying lifting forces to the braces at the start of the lifting movement.

Other objects and advantages will appear hereinafter.

In the drawings:

Figure 1 is a perspective view showing a preferred embodiment of my invention, the roof being in elevated position and the sliding bunk bed at the rear of the trailer being fully extended.

Figure 2 is a perspective view showing the roof in partially elevated position and showing operation of the lifting mechanism.

Figure 5 is a sectional plan view partly broken away taken substantially on the lines 5—5 as shown in Figure 3.

Figure 3:
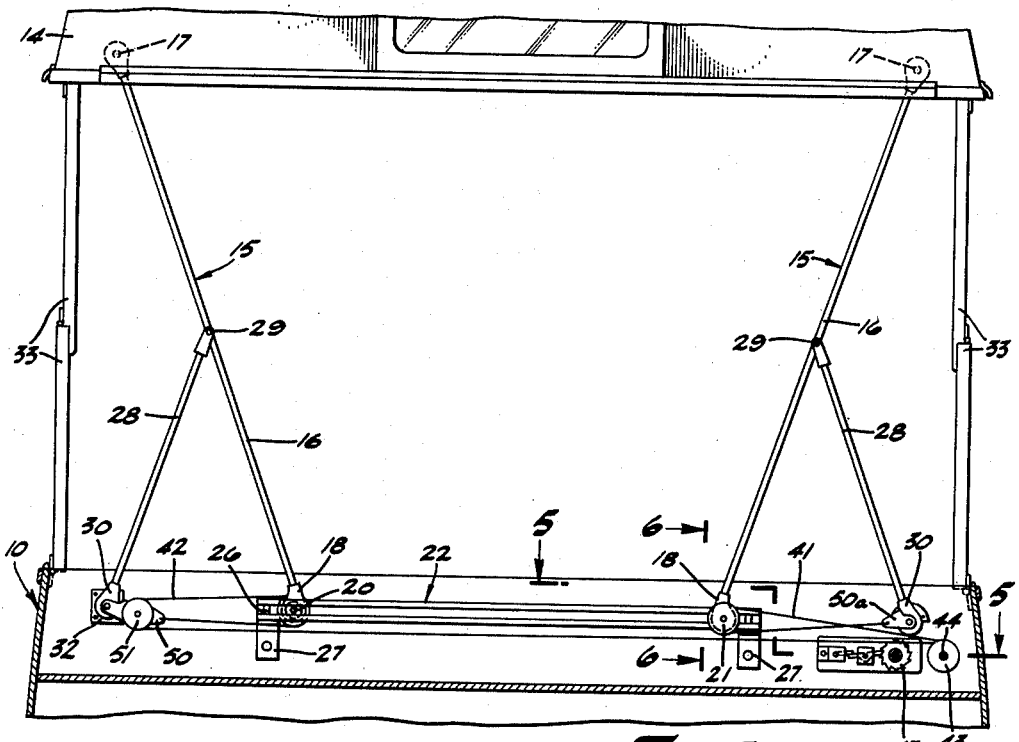
Figure 3 is an elevation view partly broken away and taken generally on the lines 3—3 as shown in Figure 2.
Figure 4:
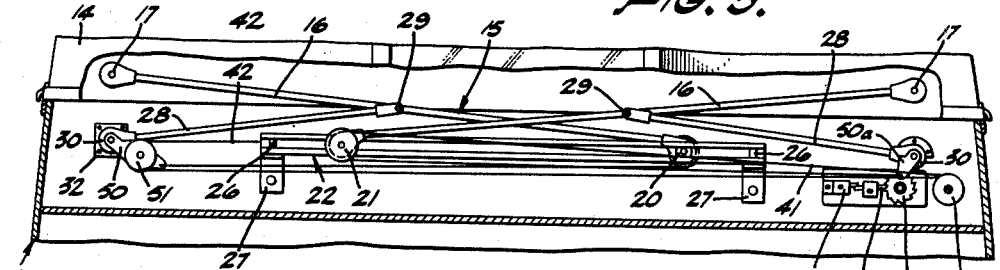
Figure 4 is a view similar to Figure 3 showing the parts of the lifting mechanism in retracted position.

Referring to the drawings:

The trailer body generally designated 10 is supported on wheels 11. A draft tongue 12 extends forwardly from the body and this draft tongue may be provided with a parking wheel 13, if desired. A roof 14 forms a closure for the body 10 when in the lowered position as shown in Figure 4. The roof is raised and lowered with respect to the body by means of the lifting mechanism generally designated 15.

As shown in the drawings, this lifting mechanism may conveniently be provided at the front and rear ends of the trailer. The mechanism comprises duplicate lifting legs 16 which are connected at their upper ends to the roof 14 by means of pivot pins 17. The lower ends of the lifting legs 16 are each provided with a bracket 18 which supports a stub shaft 19. A roller 20 is mounted on one end of this stub shaft and a pulley or sheave 21 is mounted on the other end.

A straight horizontal trackway 22 is mounted on the body 10 and this trackway includes an upper channel 23 and a lower channel 24 together with bolts 25 and spacers 26 for holding the channels in parallel relationship. The channels 23 and 24 are supported at their extreme ends by means of angle clips 27 fixed to the body 10. One of the brackets 18 is positioned forwardly of the trackway 22 and the other is positioned rearwardly thereof. The rollers 20 are therefore capable of passing each other as they roll along the trackway in opposite directions.

A brace 28 is provided for each of the lifting legs 16. The upper end of each brace is connected by a pivot pin 29 to the midpoint of the lifting leg and the lower end of each brace 28 includes a terminal fitting 30 which is pivotally mounted on the body by means of a trunnion 31 and bracket 32. The trunnion 31 is positioned directly below the corresponding pivot pin 17 and the spacing of the trunnions 31 in the direction of the horizontal trackway 22 is therefore the same as the spacing of the pivot pin 17.

From this description it will be understood that movement of the lower ends of the lifting legs 16 in opposite directions along the trackway 22 serves to raise or lower the roof 14 with respect to the body 10.

Hinged stiffeners 33 may be provided which extend from the body to the roof and which serve to brace the roof against movement when it is in its elevated position.

A pull-out drawer 34 may be slidably mounted at the rearward end of the trailer and may serve as space to provide an extra bed. The interior of the trailer may include the usual bed 35, stove and refrigerator unit 36 and cabinet 37. A hinged door 38 provides access to the interior of the trailer. Suitable canvas coverings 39 and 40 may be provided to enclose the space between the elevated roof and the body of the trailer.

Means are provided for causing movement of the lower ends of the legs 16 in opposite directions along the trackway 22 and as shown in the drawings this means includes cables 41 and 42 which pass over the pulleys 21. Each cable has one end fixed to a spooling drum 43 carried on the shaft 44. The spooling drums are fixed on the shaft and the shaft is driven by a chain-and-sprocket connection 45 from the crank shaft 46. A ratchet 47 is provided on the shaft 46 and a pawl 48 is provided to cooperate with the ratchet. A release lever 49 is provided to interrupt the operation of the pawl 48 when desired.

One end of each of the cables is fixed to a swinging arm 50, 50a. The arm 50 supports a pulley 51 by means of a pin 52. Each of the arms is pivotally mounted about one of the trunnions 31 and each arm carries an abutment pad 53 adapted to engage a shoulder 54, provided on each terminal fitting 30. The cable 41 passes from one of the drums 43 around the pulley 21 and is fixed directly to the arm 50a. The cable 42 extends from the other drum around the pulley 51 on the arm 50 and then around pulley 21 on the lower end of the lifting leg 16 shown on the left side in Figure 3. The cable 42 then returns and is fixed to the arm 50.

Figure 7:
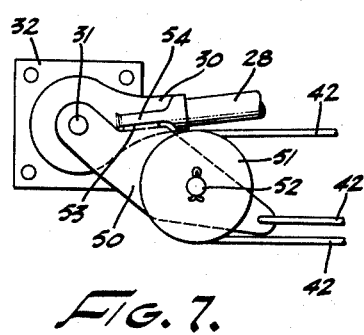
Figure 7 is a side elevation of the parts shown in Figure 6.
Figure 6:
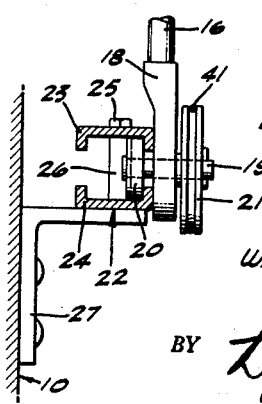
Figure 6 is a sectional detail taken substantially on the lines 6—6 as shown in Figure 3.

When it is desired to raise the roof 14 from the position shown in Figure 4 to the position shown in Figure 3, the crank 55 is inserted into the socket 56 provided on the crank shaft 46. Turning movement of the crank serves to turn the shaft 44 and cause the drums 43 to tension and wind in the cables 41 and 42. Reference to Figure 7 shows that the tensioning of the various flights of the cable 42 serves to bring the pad 53 into engagement with the shoulder 54 and thereby apply torque to the terminal fitting 30 and brace 28 in a direction to cause lifting movement of the brace. The same lifting force is applied by the arm 50a to its respective terminal fitting 30. Continued turning of the spooling drums 43 applies sufficient horizontal forces to the pulleys 21 to cause them to travel in opposite directions along the trackway 22 and thereby continue the lifting movement of the roof 14. It will be observed that the lower ends of the lifting legs 16 pass each other in the course of movement from the position shown in Figure 4 to that shown in Figure 3.

While I have described the operation of the lift means 15 at one end of the trailer it will be understood that duplicate mechanism 15 is provided at the other end of the trailer. As shown in Figure 5 the shaft 44 extends longitudinally of the trailer and is provided with spooling drums at both ends.

Having fully described my invention it is to be understood that I do not wish to be limited to the details herein set forth but my invention is of the full scope of the appended claims.

I claim:

1. In an expansible camping trailer including a wheel supported body and a vertically movable roof member adapted in one position to rest upon and form a closure for the body, the improvement comprising, in combination: lifting mechanism on the body for raising and lowering the roof member, said mechanism including a pair of duplicate lifting legs, a horizontal trackway fixed on the body, means guiding the lower ends of said lifting legs for movement along the said trackway, pivot means connecting the upper ends of said legs to said roof member at locations spaced in the direction of said trackway, a pair of brace elements, each brace element having an effective length equal to substantially one-half the effective length of each lifting leg, pivot means connecting the upper end of each brace element to a midpoint of one of said lifting legs, respectively, and connecting the lower end thereof to the body, the spacing of the lower ends of the brace elements being substantially equal to the spacing of the upper ends of the lifting legs, and means for moving the lower ends of the lifting legs along the trackway in opposite directions to pass each other and to cause the roof member to be elevated above the body.

2. In an expansible camping trailer including a wheel supported body and a vertically movable roof member adapted in one position to rest upon and form a closure for the body, the improvement comprising, in combination: lifting mechanism on the body for raising and lowering the roof member, said mechanism including a pair of duplicate lifting legs, a straight horizontal trackway fixed on the body, means guiding the lower ends of said lifting legs for movement along said trackway, pivot means connecting the upper ends of said legs to said roof member at locations spaced in the direction of said trackway, a pair of brace elements, pivot means connecting the upper end of each brace element to a midpoint of one of said lifting legs, respectively, and connecting the lower end thereof to the body, the spacing of the lower ends of the brace elements being substantially equal to the spacing of the upper ends of the lifting legs, and means for moving the lower ends of the lifting legs along the trackway in opposite directions to cause the roof member to be elevated above the body, the lengths and proportions of the parts being such that the lower ends of the lifting legs pass each other along said trackway when the roof member is raised from closed to elevated position.

3. In an expansible camping trailer including a wheel supported body and a vertically movable roof member adapted in one position to rest upon and form a closure for the body, the improvement comprising, in combination: lifting mechanism on the body for raising and lowering the roof member, said mechanism including a pair of duplicate lifting legs, a straight horizontal trackway fixed on the body, means guiding the lower ends of said lifting legs for movement along said trackway, pivot means connecting the upper ends of said legs to said roof member at fixed locations spaced in the direction of said trackway, a pair of brace elements each pivotally connected at its upper end to a mid-point of one of said lifting legs, respectively, pivot means connecting the lower end of each brace element to the body, a pulley on the lower end of each lifting leg, an arm mounted to turn about each of the latter said pivot means and having a portion adapted to apply a lifting force to one of said brace elements, a pulley on each arm, and cables passing over said pulleys and operable to move the lower end of each lifting leg toward the lower end of its respective brace element.

4. In an expansible camping trailer including a wheel supported body and a vertically movable roof member adapted in one position to rest upon and form a closure for the body, the improvement comprising, in combination: lifting mechanism on the body for raising and lowering the roof member, said mechanism including first and second duplicate lifting legs, a straight horizontal trackway fixed on the body, means guiding the lower ends of said lifting legs for movement along said trackway, pivot means connecting the upper ends of said legs to said roof member at locations spaced in the direction of said trackway, first and second brace elements, means forming a pivotal connection between the upper end of the first and second brace elements and the mid-points of the first and second lifting legs, respectively, first and second pivot means connecting the lower end of the first and second brace elements to the body, respectively, first and second arms mounted to turn about each of the latter said pivot means respectively, a pulley on the lower end of each lifting leg, an arm mounted to turn about each of the latter said pivot means and having a portion adapted to apply a lifting force to one of said brace elements, a pulley on the first arm, a pulley on the lower end of each lifting leg, a first cable rove about the pulleys on the first lifting leg and first arm and having an end secured to said first arm, a second cable rove about the pulley on the second lifting leg and having an end secured to the second arm, and common means for simultaneously tensioning both of said cables.

References Cited in the file of this patent

UNITED STATES PATENTS 1,794,165    Gannaway _____ Feb. 24, 1931

FOREIGN PATENTS 573,470    Germany _____ Dec. 22, 1929
424,764    Great Britain _____ Feb. 18, 1935